US008965631B2

(12) United States Patent
Koyama et al.

(10) Patent No.: US 8,965,631 B2
(45) Date of Patent: Feb. 24, 2015

(54) CONTROL SPECIFICATIONS CHANGING SYSTEM, CONTROL SPECIFICATIONS DATA SERVER, AND SPECIFICATIONS CHANGEABLE VEHICLE

(71) Applicant: Honda Motor Co., Ltd., Tokyo (JP)

(72) Inventors: Takatsugu Koyama, Wako (JP); Chihiro Wake, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/225,429

(22) Filed: Mar. 26, 2014

(65) Prior Publication Data

US 2014/0297108 A1 Oct. 2, 2014

(30) Foreign Application Priority Data

Mar. 29, 2013 (JP) ................................ 2013-074522

(51) Int. Cl.

| | |
|---|---|
| ***G06F 7/00*** | (2006.01) |
| ***G06F 17/00*** | (2006.01) |
| ***G06F 19/00*** | (2011.01) |
| ***G08G 1/16*** | (2006.01) |
| ***G07C 5/00*** | (2006.01) |

(52) U.S. Cl.

CPC . *G08G 1/164* (2013.01); *G07C 5/00* (2013.01)

USPC .................... 701/36; 701/22; 701/48; 701/99

(58) Field of Classification Search

CPC .... B60Q 1/2619; B60R 16/037; G08G 1/164; G07C 5/00

USPC .......................................... 701/22, 36, 48, 99

See application file for complete search history.

(56) References Cited

U.S. PATENT DOCUMENTS 6,996,463 B2 * 2/2006 Kondo ......................... 701/29.2
2013/0103230 A1 * 4/2013 Suganuma et al. ............... 701/1
2014/0277933 A1 * 9/2014 Grossman et al. .............. 701/36

FOREIGN PATENT DOCUMENTS

JP 6-328981 11/1994

OTHER PUBLICATIONS

Machine Translation of JPH06-328981(cited in IDS), retrieved on Nov. 26, 2014 from JPO AIPN.*

* cited by examiner

*Primary Examiner* — Calvin Cheung
*Assistant Examiner* — Thomas Ingram
(74) *Attorney, Agent, or Firm* — Mori & Ward, LLP

(57) ABSTRACT

A control specifications changing system includes a control specifications data server and a specifications changeable vehicle. The control specifications data server includes a second communication device and a determining device. The second communication device is configured to communicate with the specifications changeable vehicle. The determining device is configured to determine data for changing specifications upon receipt of first vehicle information data from the specifications changeable vehicle through the second communication device. The data for changing specifications includes data for use in changing control specifications of the specifications changeable vehicle to control specifications suited for the received first vehicle information data. The determining device is configured to transmit the determined data for changing specifications to the specifications changeable vehicle through the second communication device.

5 Claims, 4 Drawing Sheets

CONTROL SPECIFICATIONS CHANGING SYSTEM, CONTROL SPECIFICATIONS DATA SERVER, AND SPECIFICATIONS CHANGEABLE VEHICLE

CROSS-REFERENCE TO RELATED APPLICATIONS

The present application claims priority under 35 U.S.C. §119 to Japanese Patent Application No. 2013-074522, filed Mar. 29, 2013, entitled "Control Specifications Changing System, Control Specifications Data Server, and Specifications Changeable Vehicle." The contents of this application are incorporated herein by reference in their entirety.

BACKGROUND

1. Field

The present disclosure relates to a control specifications changing system, a control specifications data server, and a specifications changeable vehicle.

2. Description of the Related Art

There is a known control specifications changing system that enables control specifications of a vehicle to be changed according to user preference by a user of the vehicle by manipulating a gain changer and changing control parameters of the vehicle (parameters that represent characteristics of a driving system, a suspension system, and a steering system or the like) (see, for example, Japanese Unexamined Patent Application Publication No. 6-328981).

SUMMARY

According to one aspect of the present invention, a control specifications changing system includes a control specifications data server and a specifications changeable vehicle. The specifications changeable vehicle is configured to communicate with the control specifications data server and includes, a first communication device, a first storage, a controller, an acquiring device, and a changing device. The first communication device is configured to communicate with the control specifications data server. The first storage is configured to store control specifications data that specifies control specifications of the specifications changeable vehicle. The controller is configured to control the specifications changeable vehicle using the control specifications data stored in the first storage. The acquiring device is configured to acquire first vehicle information data representing information about the specifications changeable vehicle and configured to transmit the acquired first vehicle information data to the control specifications data server through the first communication device. The changing device is configured to receive data for changing specifications from the control specifications data server through the first communication device. The data for changing specifications includes data for use in changing the control specifications data. The changing device is configured to change the control specifications data stored in the first storage in accordance with the received data for changing specifications. The control specifications data server includes a second communication device and a determining device. The second communication device is configured to communicate with the specifications changeable vehicle. The determining device is configured to determine the data for changing specifications upon receipt of the first vehicle information data from the specifications changeable vehicle through the second communication device. The data for changing specifications includes data for use in changing the control specifications of the specifications changeable vehicle to control specifications suited for the received first vehicle information data. The determining device is configured to transmit the determined data for changing specifications to the specifications changeable vehicle through the second communication device.

According to another aspect of the present invention, a control specifications data server includes a second communication device and a determining device. The second communication device is configured to communicate with a specifications changeable vehicle which is configured to perform control using control specifications data that specifies control specifications. The determining device is configured to determine data for changing specifications upon receipt of first vehicle information data representing information about the specifications changeable vehicle from the specifications changeable vehicle through the second communication device. The data for changing specifications includes data for use in changing the control specifications data for the specifications changeable vehicle to control specifications suited for the received first vehicle information data. The determining device is configured to transmit the determined data for changing specifications to the specifications changeable vehicle through the second communication device.

According to further aspect of the present invention, a specifications changeable vehicle includes a first communication device, a first storage, a controller, an acquiring device, and a changing device. The first communication device is configured to communicate with a control specifications data server to receive from a control specifications data server control specifications data that specifies control specifications. The first storage is configured to store the control specifications data that specifies the control specifications of the specifications changeable vehicle. The controller is configured to control the specifications changeable vehicle using the control specifications data stored in the first storage. The acquiring device is configured to acquire vehicle information data representing information about the specifications changeable vehicle and configured to transmit the acquired vehicle information data to the control specifications data server through the first communication device. The changing device is configured to change the control specifications data stored in the first storage upon receipt of data for changing specifications from the control specifications data server through the first communication device in accordance with the received data for changing specifications. The received data for changing specifications includes data for use in changing the control specifications data for the specifications changeable vehicle to control specifications suited for the transmitted vehicle information data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
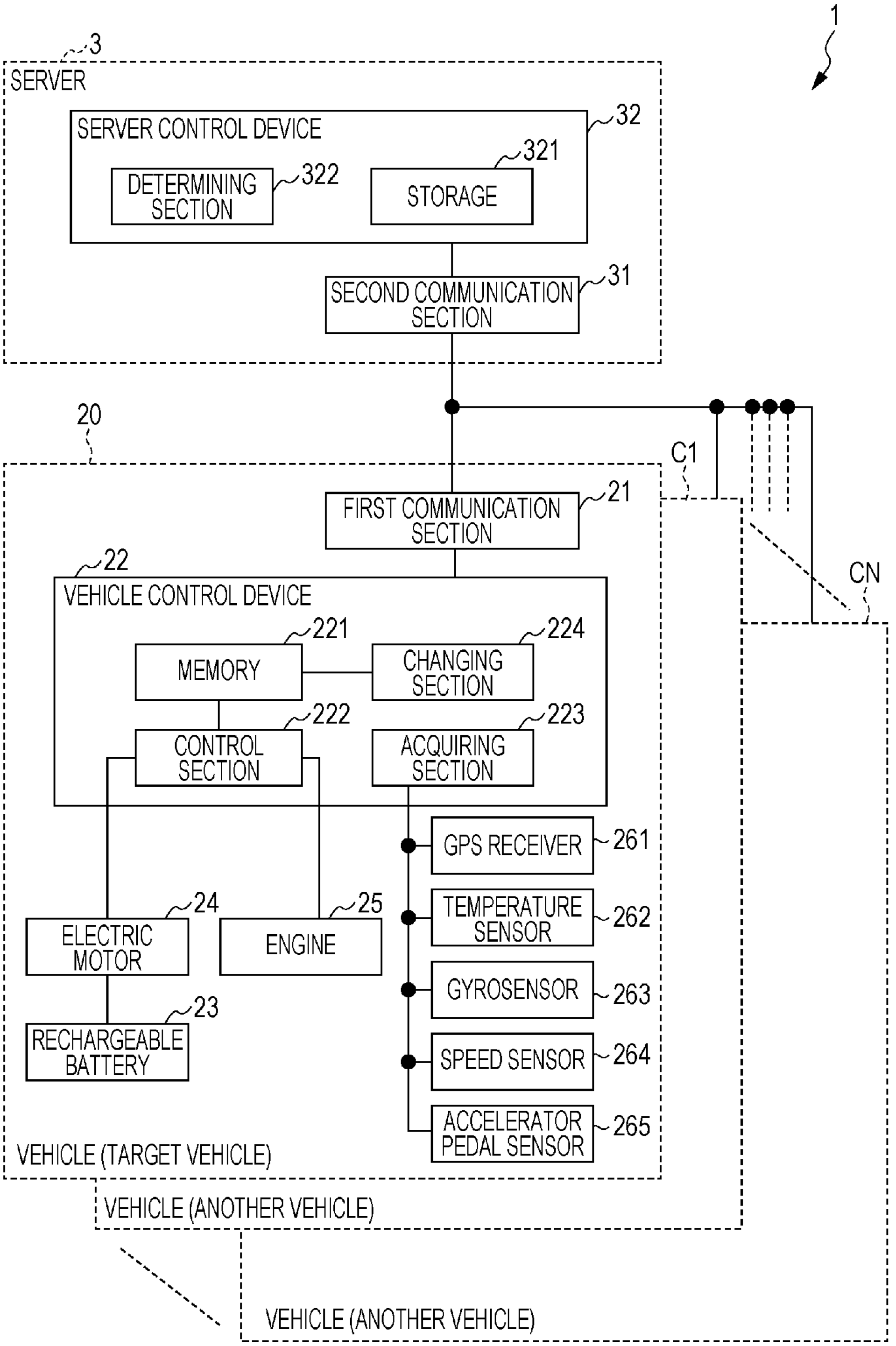
FIG. 1 is a functional block diagram of a control specifications changing system according to an embodiment.

The embodiments will now be described with reference to the accompanying drawings, wherein like reference numerals designate corresponding or identical elements throughout the various drawings.

A control specifications changing system 1 for a vehicle according to an embodiment is described below with reference to FIG. 1.

The control specifications changing system 1 is broadly divisible into a plurality of vehicles 20 and C1 to CN (N is a natural number; these vehicles correspond to a specifications changeable vehicle and information providing vehicles) and a server 3 (corresponding to a control specifications data server). The vehicles 20 and C1 to CN and the server 3 can communicate with each other.

Hereinafter, for the sake of convenience of the description, of the vehicles 20 and C1 to CN, the vehicle 20 is an object that will be mainly described and is referred to as the target vehicle 20, and the vehicles C1 to CN, which are other than the target vehicle 20, are referred to as another vehicle C1 to another CN. The vehicles 20 and C1 to CN have the same configuration, and the configuration of the target vehicle 20 is representatively described below.

The target vehicle 20 is a vehicle having changeable control specifications (specifications changeable vehicle).

Specifically, the target vehicle 20 includes a first communication section 21 configured to wirelessly communicate with the server 3 (specifically, a second communication section 31 (described below) included in the server 3) and a vehicle control device 22.

The target vehicle 20 also includes a global positioning system (GPS) receiver 261, a temperature sensor 262, a gyrosensor 263, a speed sensor 264, and an accelerator pedal sensor 265 as equipment for sensing vehicle information data (data indicating information about a vehicle).

The GPS receiver 261 receives GPS information including position information (latitude and longitude) and date and time information. The temperature sensor 262 senses a temperature around the target vehicle 20 (outside air temperature). The gyrosensor 263 senses an angle of inclination with respect to the horizontal of the target vehicle 20. The speed sensor 264 senses a travel speed (vehicle speed) of the target vehicle 20. The accelerator pedal sensor 265 senses an actuation variable of the accelerator pedal (accelerator pedal actuation variable).

The target vehicle 20 further includes a rechargeable battery 23, an electric motor 24, and an engine 25 and is a hybrid vehicle using the electric motor 24 and the engine 25 as driving sources.

The rechargeable battery 23 outputs driving power to the electric motor 24 and is recharged by regenerative power from the electric motor 24.

The electric motor 24 drives driving wheels (not illustrated) by a driving force corresponding to power output from the rechargeable battery 23. The electric motor 24 functions as a generator configured to acquire regenerative power by converting kinetic energy of the vehicle into electric energy when the vehicle including the electric motor 24 is braked.

The engine 25 is configured as an internal combustion engine and drives the driving wheels (not illustrated) using a driving force output from the engine 25.

The vehicle control device 22 is an electronic circuit unit including a central processing unit (CPU), a read-only memory (ROM), a random-access memory (RAM), an input/output (I/O) circuit, and other components. The vehicle control device 22 stores control specifications data that specifies control specifications of the vehicle including the vehicle control device 22 in a memory 221 (corresponding to a first storing section) including the ROM, RAM, and the like. The control specifications data is data including at least one of a predetermined control program and control data, such as a reference value, a map, and a table.

The vehicle control device 22 functions as an acquiring section 223 or a changing section 224 by causing the CPU to execute the control program being part of the control specifications data stored in the memory 221 and performs control corresponding to the control specifications of the vehicle including the vehicle control device 22 (functions as a control section 222).

The server 3 includes the second communication section 31 including wireless communication equipment configured to wirelessly communicate with the plurality of vehicles 20 and C1 to CN (specifically, the first communication section 21 included in each of the vehicles 20 and C1 to CN) and a server control device 32 configured to control operations of the server 3.

The server control device 32 is a computer including a CPU, a ROM, a RAM, an I/O circuit, and other components. The server control device 32 stores a plurality of pieces of vehicle information data in a storage 321 (corresponding to a second storing section) including the ROM, the RAM, and the like. The server control device 32 functions as a determining section 322 by causing the CPU to execute a control program stored in the ROM, the RAM, and the like.

Next, a procedure of changing the control specifications of the target vehicle 20 by processes performed by the vehicle control device 22 in the target vehicle 20 and the server control device 32 in the server 3 is described with reference to FIGS. 2 to 4.

Figure 2:
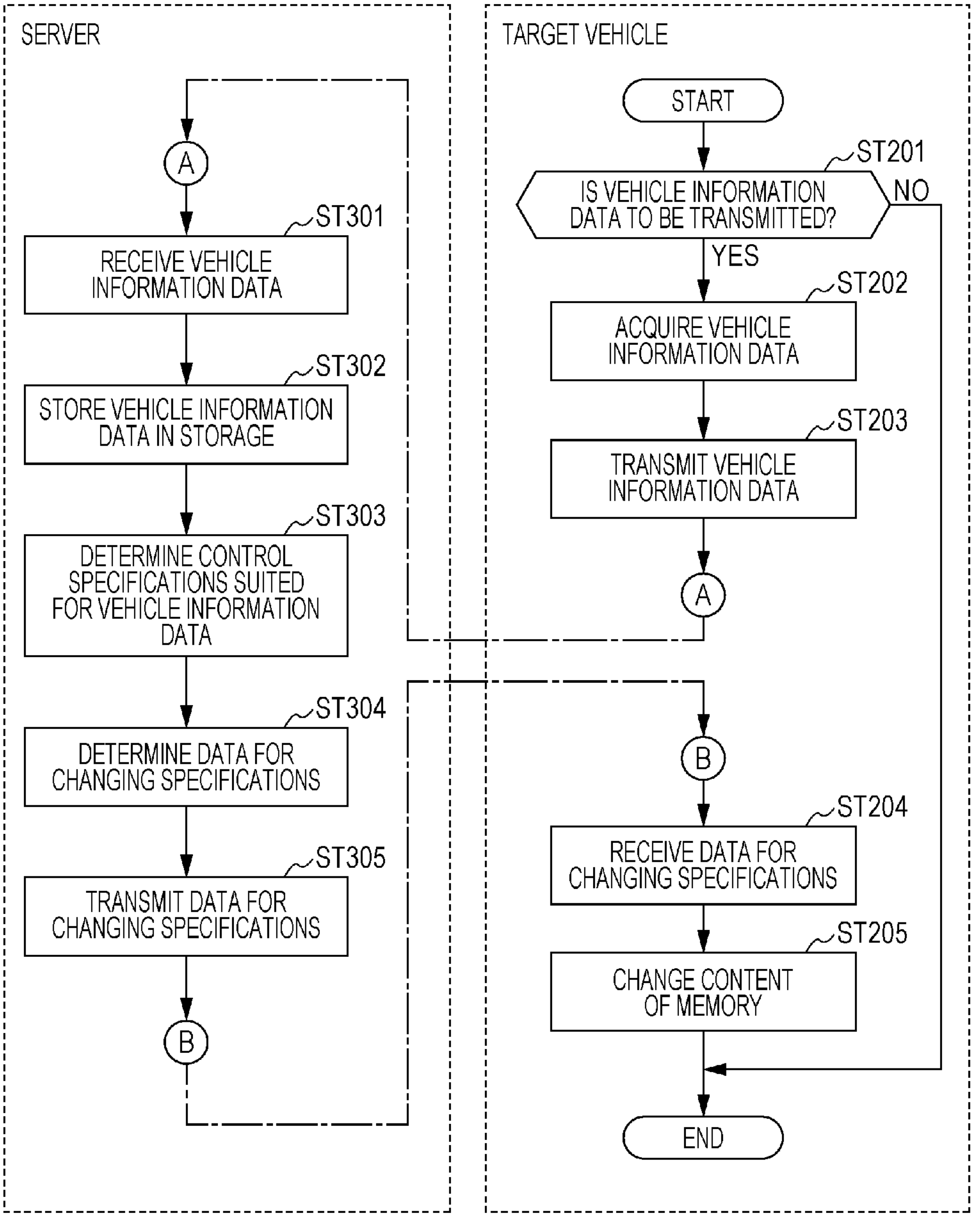
FIG. 2 is a flowchart that illustrates a procedure of a process for changing control specifications by a vehicle control device and a server control device according to the embodiment.

The process indicated by the flowchart on the right-hand side in FIG. 2 is performed by the vehicle control device 22 at predetermined intervals (e.g., every one minute). The process indicated by the flowchart on the left-hand side in FIG. 2 is performed by the server control device 32 when vehicle information data is transmitted from any one of the vehicles 20 and C1 to CN.

First, at step ST201, the vehicle control device 22 determines whether it is to transmit vehicle information data. For example, the vehicle control device 22 determines that it is to transmit the vehicle information data when a predetermined period of time (e.g., five minutes) has elapsed from the previous transmission of the vehicle information data to the server 3.

The determination at step ST201 is not limited to the determination using the above-described condition and may use another condition. For example, the vehicle control device 22 may determine that it is to transmit the vehicle information data on the condition that the situation of the vehicle identified by the vehicle control device 22 performing a process substantially the same as a process for identifying the situation of the vehicle (see FIG. 4), the identifying process being described below, has changed. For example, a plurality of conditions may be set, and the vehicle control device 22 may determine that it is to transmit the vehicle information data when one of the plurality of conditions is satisfied or when all of the plurality of conditions are satisfied.

When it is determined at step ST201 that the vehicle information data is not to be transmitted, the vehicle control device 22 completes the process on the right-hand side in FIG. 2.

When it is determined at step ST201 that the vehicle control device 22 is to transmit the vehicle information data, the processing proceeds to step ST202. At step ST202, the vehicle control device 22 acquires data based on outputs from the pieces of sensing equipment 261 to 265 as the vehicle information data.

Specifically, the vehicle control device 22 acquires, as the vehicle information data, position data and date and time information contained in GPS data received by the GPS receiver 261, an outside air temperature sensed by the temperature sensor 262, an angle of inclination sensed by the gyrosensor 263, a vehicle speed sensed by the speed sensor 264, an accelerator pedal actuation variable sensed by the accelerator pedal sensor 265, a state of charge (SOC) of the rechargeable battery 23, a fuel consumption estimated amount (estimated value of the amount of fuel consumed by the engine 25 estimated from progression of the accelerator pedal actuation variable, progression of the vehicle speed, and the like), and progression of each of these values for a predetermined period of time.

The vehicle information data contains information representing the control specifications of the target vehicle 20 at the time of transmitting the vehicle information data, in addition to the above-described data.

After the completion of step ST202, the processing proceeds to step ST203. At step ST203, the vehicle control device 22 transmits the vehicle information data acquired at step ST202 to the server 3 through the first communication section 21. At that time, identifying information unique to the target vehicle 20 is added to the vehicle information data to make which of the vehicles 20 and C1 to CN transmits the vehicle information data recognizable. This enables the server 3 to recognize the vehicle having transmitted the vehicle information data by the identifying information.

Steps ST202 and ST203 correspond to the processing of the acquiring section 223.

After the completion of step ST203, the vehicle control device 22 waits for a response from the server 3 and performs the processing at step ST204 and its subsequent step, which are described below.

When the server control device 32 receives the vehicle information data from any one of the vehicles 20 and C1 to CN, the server control device 32 performs the process indicated by the flowchart on the left-hand side in FIG. 2. For the sake of convenience of the description, a case where the server control device 32 receives the vehicle information data from the target vehicle 20 is described below.

First, at step ST301, the server control device 32 receives the vehicle information data through the second communication section 31. If the processing at step ST301 has not been normally completed, the server control device 32 requests the target vehicle 20 to transmit the vehicle information data again. This enables the server control device 32 to receive the vehicle information data with reliability.

After the completion of step ST301, the processing proceeds to step ST302. At step ST302, the server control device 32 stores the vehicle information data acquired at step ST301 in the storage 321.

After the completion of step ST302, the processing proceeds to step ST303. At step ST303, the server control device 32 determines the control specifications suited for the received vehicle information data.

Figure 3:
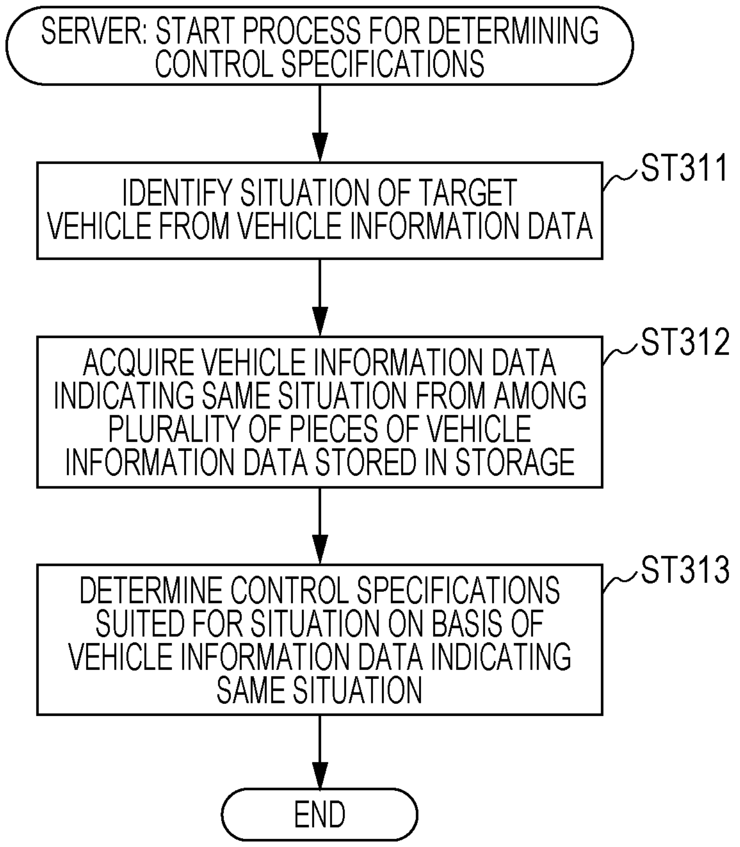
FIG. 3 is a flowchart that illustrates a detailed procedure of step ST303 in FIG. 2.

The details of step ST303 in FIG. 2 are described here with reference to FIG. 3.

Figure 4:
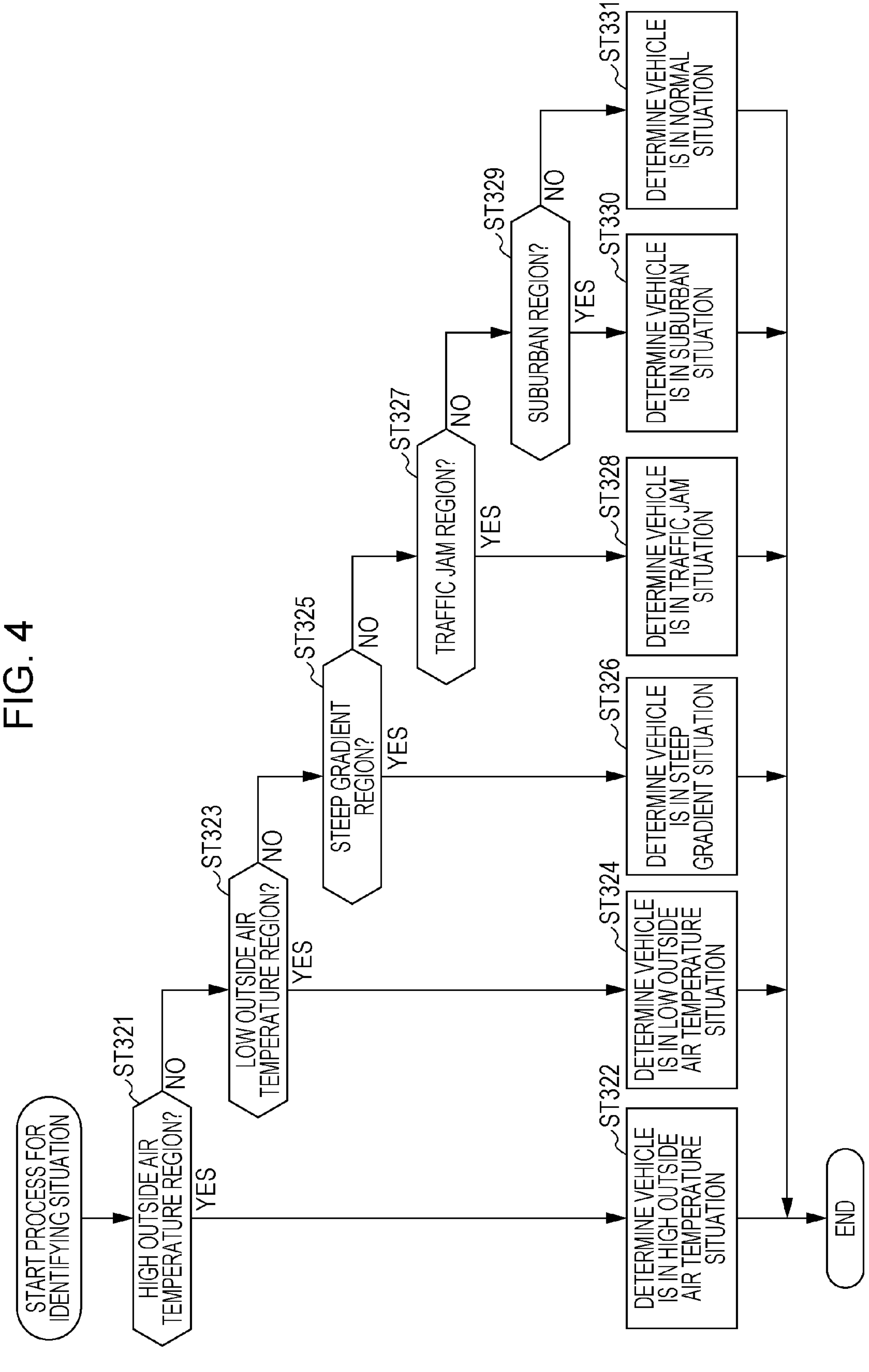
FIG. 4 is a flowchart that illustrates a detailed procedure of step ST311 in FIG. 3.

First, at step ST311, the server control device 32 identifies the situation of the vehicle from the vehicle information data using the flowchart illustrated in FIG. 4.

The details of step ST311 in FIG. 3 are described here with reference to FIG. 4. The server control device 32 identifies the situation of the vehicle as one of six situations (high outside air temperature situation, low outside air temperature situation, steep gradient situation, traffic jam situation, suburban situation, and normal situation) on the basis of the data items in the vehicle information data.

When the target vehicle 20 is used in a high outside air temperature region (the outside air temperature in the vehicle information data is higher than a predetermined temperature for determining a high outside air temperature), the server control device 32 determines that the situation of the target vehicle 20 is a high outside air temperature situation, where the target vehicle 20 is located in a high outside air temperature region (YES at step ST321, and step ST322).

When the target vehicle 20 is used in a low outside air temperature region (the outside air temperature in the vehicle information data is lower than a predetermined temperature for determining a low outside air temperature), the server control device 32 determines that the situation of the target vehicle 20 is a low outside air temperature situation, where the target vehicle 20 is located in a low outside air temperature region (YES at step ST323, and step ST324).

When the target vehicle 20 is used in a steep gradient region (the absolute value of the angle of inclination in the vehicle information data is larger than a predetermined angle for determining a steep gradient), the server control device 32 determines that the situation of the target vehicle 20 is a steep gradient situation, where the target vehicle 20 is located in a steep gradient region (YES at step ST325, and step ST326).

When the target vehicle 20 is used in a traffic jam region, the server control device 32 determines that the situation of the target vehicle 20 is a traffic jam situation, where the target vehicle 20 is located in a traffic jam region (YES at step ST327, and step ST328). Whether the target vehicle 20 is used in a traffic jam region or not is determined on the basis of progress of the vehicle speed in the vehicle information data and progress of the accelerator pedal actuation variable in the vehicle information data. For example, when it is estimated from progress of the vehicle speed and progress of the accelerator pedal actuation variable that the target vehicle 20 is alternately repeating stops and starts because of a traffic jam, the server control device 32 determines that the situation of the target vehicle 20 is a traffic jam situation.

More specifically, the server control device 32 determines that the situation of the target vehicle 20 is a traffic jam situation "when a state where the vehicle speed is lower than a predetermined value and a state where the vehicle speed is zero (where the vehicle is standing still) repeatedly occur within a predetermined short period of time" or "when a state where no torque is requested (where the accelerator pedal actuation variable is zero) and a state where torque is requested (where the accelerator pedal actuation variable is not zero) repeatedly occur within a predetermined period of time."

When the target vehicle 20 is used in a suburban region, the server control device 32 determines that the situation of the target vehicle 20 is a suburban situation, where the target vehicle 20 is located in a suburban region (YES at step ST329, and step ST330). Whether the target vehicle 20 is used in a suburban region or not is determined on the basis of progress of the vehicle speed in the vehicle information data and progress of the accelerator pedal actuation variable in the vehicle information data. For example, when a period of time for which the vehicle speed remains constant (or substantially constant) is equal to or larger than a predetermined value or when a period of time for which the accelerator pedal actuation variable remains constant (or substantially constant) is equal to or larger than a predetermined value, the server control device 32 determines that the situation of the target vehicle 20 is a suburban situation.

The above-described conditions used in the determinations at steps ST321, ST323, ST325, ST327, and ST329 are determined in advance by, for example, experiment to enable the situation of each vehicle to be identified accurately.

When the situation of the target vehicle 20 does not match any of the above-described five situations (high outside air temperature situation, low outside air temperature situation, steep gradient situation, traffic jam situation, and suburban situation), the server control device 32 determines that the situation of the target vehicle 20 is a normal situation (step ST331).

The conditions for identifying the situation of the target vehicle 20 are not limited to the above-described ones. For example, the server control device 32 may identify the situation of the target vehicle 20 on the basis of position information and date and time information received by the GPS and other information.

For example, if the other information is an expected temperature in a weather forecast, the server control device 32 can assume the expected temperature in the weather forecast for the "time corresponding to date and time information" in the "region corresponding to position information" as an actual outside air temperature. If the other information is statistical information about past outside air temperatures in each region, the server control device 32 can assume a value estimated from the outside air temperature in the statistical information for the "time corresponding to date and time information" in the "region corresponding to position information" as an actual outside air temperature.

When the outside air temperature assumed in the above-described way is higher than the previously described predetermined temperature for determining the high outside air temperature, the server control device 32 can determine that the situation of the target vehicle 20 is a high outside air temperature situation, where the target vehicle 20 is located in a high outside air temperature region. When the assumed outside air temperature is lower than the previously described predetermined temperature for determining the low outside air temperature, the server control device 32 can determine that the situation of the target vehicle 20 is a low outside air temperature situation, where the target vehicle 20 is located in a low outside air temperature region.

For example, if the other information is an angle of inclination set in map data or the like to which the server 3 can refer, the server control device 32 can assume an angle of inclination acquired by estimation from a value set in the map data or the like for the "region corresponding to position information" as an actual angle of inclination. When the angle of inclination is larger than the previously described predetermined angle for determining the steep gradient, the server control device 32 can determine that the situation of the target vehicle 20 is a steep gradient situation, where the target vehicle 20 is located in a steep gradient region.

For example, if the other information is traffic jam information, the server control device 32 can determine whether the situation is a traffic jam situation in response to the traffic jam information for the "region corresponding to position information."

For example, if the other information is map data or the like to which the server 3 can refer, the server control device 32 can determine whether the situation is a suburban situation using the map data or the like for the "region corresponding to position information."

The identifiable situations of the vehicle are not limited to the six situations illustrated in FIG. 4 and may be identified as another situation (e.g., situation where the vehicle is running on an expressway). The situation of the vehicle may be identified as one of not all of the above-described situations but limited several situations.

The details of the process for identifying the situation illustrated in FIG. 4 are described above. The description returns to FIG. 3.

After the completion of step ST311 (after the completion of the process in the flowchart in FIG. 4), the processing proceeds to step ST312. At step ST312, the server control device 32 acquires vehicle information data in the same situation from among the plurality of pieces of vehicle information data stored in the storage 321.

Specifically, first, the server control device 32 identifies the situation of the vehicle for each of the plurality of pieces of vehicle information data stored in the storage 321 in substantially the same manner as the process in the flowchart in FIG. 4 at the time the vehicle information data was acquired. Then the server control device 32 acquires, from among the pieces of vehicle information data stored in the storage 321, one or more pieces of vehicle information data identified as the same situation of the target vehicle 20 identified at step ST311 (hereinafter, such vehicle information data is referred to as "same situation vehicle information data").

The same situation vehicle information data acquired at step ST312 corresponds to "vehicle information data that satisfies the same condition as a predetermined condition that the vehicle information data for the specifications changeable vehicle satisfies among the plurality of pieces of vehicle information data stored in the second storing section." The "predetermined condition" is a condition for determining the situation of the vehicle illustrated in FIG. 4 (above-described step ST321, ST323, ST325, ST327, or ST329).

After the completion of step ST312, the processing proceeds to step ST313. At step ST313, the server control device 32 determines the control specifications suited for the situation of the target vehicle 20 in accordance with the same situation vehicle information data acquired at step ST312.

For example, the server control device 32 determines, from an estimated amount of fuel consumed and its progress, the control specifications of the target vehicle 20 in accordance with information representing the control specifications included in the same situation vehicle information data indicating high fuel efficiency among the pieces of same situation vehicle information data.

Specifically, when there are a plurality of pieces of same situation vehicle information data being matched, the server control device 32 determines the control specifications of the target vehicle 20 such that they are equal to control specifications acquired from information representing the control specifications included in the same situation vehicle information data indicating the highest fuel efficiency among the pieces of same situation vehicle information data.

When the control specifications of the target vehicle 20 become the control specifications determined in such a way, it can be expected that the fuel efficiency of the target vehicle 20 will be improved.

Because the server control device 32 determines the control specifications of the target vehicle 20 in accordance with one or more pieces of vehicle information data in the same situation of the target vehicle 20, more situations can be supported as compared to when the control specifications of the target vehicle 20 are determined on the basis of only the vehicle information data for the target vehicle 20. Accordingly, the control specifications more suitable for the situation of the target vehicle 20 can be determined.

For example, in the case of a vehicle that learns from data acquired during running, it is difficult to acquire optimal control specifications unless the vehicle has run for a certain amount of time or distance to collect data.

In contrast, in the control specifications changing system 1 according to the present embodiment, as described above, the server control device 32 determines the control specifications of the target vehicle 20 in accordance with control specifications in an appropriate state (e.g., indicating high fuel efficiency) for the target vehicle 20 among the control specifications included in the vehicle information data for another vehicle CN in the same situation of the target vehicle 20 stored in advance in the storage 321. Consequently, in the present embodiment, even if a travel time or a travel distance is small or zero, the control specifications can be changed to the ones suited for the situation of the target vehicle 20.

The server control device 32 may change the control specifications to the ones having various objectives, in addition to the ones aiming at improving the fuel efficiency. For example, the server control device 32 may change the control specifications to the ones aiming at improving the durability of the rechargeable battery 23 or the ones aiming at improving the drivability.

How the server control device 32 determines the control specifications with respect to each of the above-described six situations is specifically described below.

Here, a case where the server control device 32 changes "desired value of SOC of the rechargeable battery 23 (desired SOC)" or "motor torque map that specifies an output torque of the electric motor 24 corresponding to the degree of opening of the accelerator pedal (or required output) for the vehicle and corresponding to the vehicle speed)" or the like such that it is suited for each situation (high outside air temperature situation, low outside air temperature situation, steep gradient situation, traffic jam situation, suburban situation, and normal situation) is described as an example.

In that example, in a normal situation, the server control device 32 changes the control specifications such that a desired SOC or motor torque map at which the highest fuel efficiency will be obtained (or at which the durability of the rechargeable battery 23 will be improved) is used. In a high outside air temperature situation, where heavy use of an air-conditioning apparatus (not illustrated) is predicted, the server control device 32 changes the control specifications such that the motor torque map is changed to the one considering that prediction or such that the condition for starting the engine 25 from running solely depending on the driving force of the electric motor 24 is changed.

In a low outside air temperature situation, where the output efficiency of the rechargeable battery 23 decreases, the server control device 32 changes the control specifications such that the motor torque map considering such a decrease is used. In a steep gradient situation with a downward slope, because it is expected that much regenerative power will be obtained due to the downward slope, the server control device 32 changes the control specifications such that a desired SOC smaller than normally is used.

In a traffic jam situation, where it is predicted that stops and starts will repeatedly occur within a short time period, the server control device 32 changes the control specifications such that a motor torque map and a desired SOC considering that prediction are used. In a suburban situation, where it is predicted that the frequencies of stops and starts will be low, the server control device 32 changes the control specifications such that a motor torque map and a desired SOC considering that prediction are used.

The process for determining the control specifications suited for received vehicle information data by the server control device 32 is not limited to the above-described example.

After the completion of step ST303, the processing proceeds to step ST304. At step ST304, the server control device 32 determines data for changing specifications in accordance with the control specifications determined at step ST303. The data for changing specifications is data for use in changing the control specifications data. For example, if a specific reference value in the control specifications of the target vehicle 20 at the present time is to be changed in order to change the control specifications of the target vehicle 20 to new control specifications determined by the server control device 32, the data for changing specifications is made up of information indicating that the reference value is to be changed and the new reference value.

If the vehicle control device 22 in the target vehicle 20 is to write received data into the memory 221 without processing it at step ST205, which is described below, the data for changing specifications may be control specifications data itself.

After the completion of step ST304, the processing proceeds to step ST305. At step ST305, the server control device 32 transmits the data for changing specifications determined at step ST304 to the vehicle associated with the identifying information added to the vehicle information data received at step ST301 (target vehicle 20). After the completion of step ST305, the server control device 32 completes the process in the flowchart on the left-hand side in FIG. 2.

Steps ST303 to ST305 correspond to the processing of the determining section 322.

When the vehicle control device 22 receives the data for changing specifications from the server 3, the vehicle control device 22 performs the processing at step ST204. At step ST204, the vehicle control device 22 receives the data for changing specifications from the server 3 through the first communication section 21.

If the processing at step ST204 has not been normally completed, the vehicle control device 22 requests the server 3 to transmit the data for changing specifications again or transmits vehicle information data to the server 3 again. This enables the vehicle control device 22 to receive the data for changing specifications with reliability.

After the completion of step ST204, the processing proceeds to step ST205. At step ST205, the vehicle control device 22 changes the content of the memory 221 in accordance with the data for changing specifications received at step ST204. Steps ST204 and ST205 correspond to the processing of the changing section 224.

After the completion of step ST205, the vehicle control device 22 completes the process in the flowchart on the right-hand side in FIG. 2.

As described above, the target vehicle 20 receives the data for changing specifications suited for the vehicle information data for the target vehicle 20 from the server 3 and changes the control specifications data stored in the memory 221. Thus the control specifications of the target vehicle 20 are changed to the control specifications suited for the situation of the target vehicle 20. Accordingly, the control specifications of the target vehicle 20 can be easily changed such that they are suited for the situation of the target vehicle 20 without special manipulation by a user.

In the present embodiment, a case where each of the other vehicles C1 to CN is a specifications changeable vehicle having changeable control specifications is described as an example. However, it is merely required that each of the other vehicles C1 to CN be a vehicle including at least the first communication section 21 and the acquiring section 223 (corresponding to an information providing vehicle).

In the present embodiment, each of the vehicles 20 and C1 to CN includes the GPS receiver 261, the temperature sensor 262, the gyrosensor 263, the speed sensor 264, and the accelerator pedal sensor 265 as equipment for sensing vehicle information data. Each of the vehicles 20 and C1 to CN may include sensing equipment other than the above-described components or may not include at least any one of the above-described components.

In the present embodiment, the position information and the date and time information, the outside air temperature, the angle of inclination, the vehicle speed, the accelerator pedal actuation variable, progress of each of these items for a predetermined time period, the SOC of the rechargeable battery 23, and information for recognizing the control specifications of the target vehicle 20 at the present time are used as vehicle information data. The vehicle information data may include information other than the above-described pieces of data or may not include at least any one of these pieces of data.

In the present embodiment, each of the vehicles 20 and C1 to CN is described as a hybrid vehicle, but it is not limited to that type of vehicle. For example, each of the vehicles 20 and C1 to CN may be vehicles having various configurations, such as a gasoline vehicle including the engine 25 as the sole driving source and an electric vehicle including the electric motor 24 as the sole driving source. In the present embodiment, each of the vehicles 20 and C1 to CN is described as a specifications changeable vehicle. It is merely required that the target vehicle 20 be a specifications changeable vehicle and that each of the vehicles C1 to CN be an information providing vehicle. Each of the vehicles C1 to CN may not be a specifications changeable vehicle.

In the present embodiment, the server 3 determines the control specifications of a specifications changeable vehicle (target vehicle 20) in accordance with vehicle information data in the same situation of the specifications changeable vehicle. The server 3 may determine the control specifications of the specifications changeable vehicle on the basis of only the vehicle information data for the specifications changeable vehicle. Even in that case, when the server is configured to determine the control specifications suited for the vehicle information data for the specifications changeable vehicle, the advantageous effect of being able to easily change the control specifications of the specifications changeable vehicle such that they are suited for the situation in which the specifications changeable vehicle is used is obtainable.

According to the embodiments, a control specifications changing system includes a specifications changeable vehicle and a control specifications data server. The specifications changeable vehicle and the control specifications data server are capable of communicating with each other. The specifications changeable vehicle includes a first communication section, a first storing section, a control section, an acquiring section, and a changing section. The first communication section is configured to communicate with the control specifications data server. The first storing section is configured to store control specifications data that specifies control specifications of the specifications changeable vehicle. The control section is configured to control the specifications changeable vehicle using the control specifications data stored in the first storing section. The acquiring section is configured to acquire vehicle information data representing information about the specifications changeable vehicle and configured to transmit the acquired vehicle information data to the control specifications data server through the first communication section. The changing section is configured to receive data for changing specifications from the control specifications data server through the first communication section, the data for changing specifications being data for use in changing the control specifications data, and configured to change the control specifications data stored in the first storing section in accordance with the received data for changing specifications. The control specifications data server includes a second communication section and a determining section. The second communication section is configured to communicate with the specifications changeable vehicle. The determining section is configured to determine the data for changing specifications upon receipt of the vehicle information data from the specifications changeable vehicle through the second communication section, the data for changing specifications being data for use in changing the control specifications of the specifications changeable vehicle to control specifications suited for the received vehicle information data, and configured to transmit the determined data for changing specifications to the specifications changeable vehicle through the second communication section.

As described above, the acquiring section included in the specifications changeable vehicle transmits the vehicle information data to the control specifications data server. Upon receipt of the vehicle information data, the determining section included in the control specifications data server transmits the data for changing specifications for use in changing the control specifications of the specifications changeable vehicle to the control specifications suited for the received vehicle information data. Upon receipt of the data for changing specifications, the changing section included in the specifications changeable vehicle changes the control specifications data stored in the first storing section in accordance with the received data for changing specifications. This enables the control section to control the specifications changeable vehicle using the changed control specifications data.

Thus, as described above, the control specifications of the specifications changeable vehicle are changed to the control specifications suited for the vehicle information data without user manipulation. Accordingly, the control specifications of the specifications changeable vehicle can be easily changed such that they are suited for the situation in which the specifications changeable vehicle is used.

In the embodiments, the second communication section may be configured to communicate with a plurality of information providing vehicles each including at least the first communication section and the acquiring section, the control specifications data server may further include a second storing section configured to store the plurality of pieces of vehicle information data received from the plurality of information providing vehicles through the second communication section, and the determining section may be configured to determine the data for changing specifications in accordance with vehicle information data that satisfies the same condition as a predetermined condition that the vehicle information data for the specifications changeable vehicle satisfies among the plurality of pieces of vehicle information data stored in the second storing section upon receipt of the vehicle information data from the specifications changeable vehicle through the second communication section.

According to the above configuration, the control specifications of the specifications changeable vehicle can be changed in accordance with the vehicle information data for another vehicle (information providing vehicle), the vehicle information data satisfying the same condition as the predetermined condition that the specifications changeable vehicle satisfies. Thus, more situations in which the specifications changeable vehicle is used can be supported as compared to when the control specifications of the specifications changeable vehicle are changed on the basis of only the vehicle information data for the specifications changeable vehicle. Accordingly, the control specifications of the specifications changeable vehicle can be changed to the control specifications more suitable for the situation in which the specifications changeable vehicle is located.

According to the embodiments, a control specifications data server includes a second communication section and a determining section. The second communication section is configured to communicate with a specifications changeable vehicle configured to perform control using control specifications data that specifies control specifications. The determining section is configured to determine data for changing specifications upon receipt of vehicle information data representing information about the specifications changeable vehicle from the specifications changeable vehicle through the second communication section, the data for changing specifications being data for use in changing the control specifications data for the specifications changeable vehicle to control specifications suited for the received vehicle information data, and configured to transmit the determined data for changing specifications to the specifications changeable vehicle through the second communication section.

As described above, upon receipt of the vehicle information data, the determining section included in the control specifications data server determines the data for changing specifications for use in changing the control specifications of the specifications changeable vehicle to the control specifications suited for the received vehicle information data and transmits the determined data to the specifications changeable vehicle. The specifications changeable vehicle can receive and change the transmitted data for changing specifications.

Consequently, the control specifications of the specifications changeable vehicle can become the control specifications suited for the vehicle information data even without user manipulation. Accordingly, the control specifications of the specifications changeable vehicle can be changed such that they are suited for the situation in which the specifications changeable vehicle is used.

In the embodiments, the second communication section may be configured to communicate with a plurality of information providing vehicles each configured to transmit the vehicle information data to the control specifications data server, the control specifications data server may further include a second storing section configured to store the plurality of pieces of vehicle information data received from the plurality of information providing vehicles through the second communication section, and the determining section may be configured to determine the data for changing specifications in accordance with vehicle information data that satisfies the same condition as a predetermined condition that the vehicle information data for the specifications changeable vehicle satisfies among the plurality of pieces of vehicle information data stored in the second storing section upon receipt of the vehicle information data from the specifications changeable vehicle through the second communication section.

According to the above configuration, the control specifications data server can determine the control specifications of the specifications changeable vehicle in accordance with the vehicle information data for another vehicle (information providing vehicle), the vehicle information data satisfying the same condition as the predetermined condition that the specifications changeable vehicle satisfies. Thus, more situations in which the specifications changeable vehicle is used can be supported as compared to when the control specifications of the specifications changeable vehicle are changed on the basis of only the vehicle information data for the specifications changeable vehicle. Accordingly, the control specifications of the specifications changeable vehicle can be changed to the control specifications more suitable for the situation in which the specifications changeable vehicle is located.

According to the embodiments, a specifications changeable vehicle capable of receiving control specifications data that specifies control specifications from a control specifications data server includes a first communication section, a first storing section, a control section, an acquiring section, and a changing section. The first communication section is configured to communicate with the control specifications data server. The first storing section is configured to store the control specifications data that specifies the control specifications of the specifications changeable vehicle. The control section is configured to control the specifications changeable vehicle using the control specifications data stored in the first storing section. The acquiring section is configured to acquire vehicle information data representing information about the specifications changeable vehicle and configured to transmit the acquired vehicle information data to the control specifications data server through the first communication section. The changing section is configured to change the control specifications data stored in the first storing section upon receipt of data for changing specifications from the control specifications data server through the first communication section in accordance with the received data for changing specifications, the received data for changing specifications being data for use in changing the control specifications data for the specifications changeable vehicle to control specifications suited for the transmitted vehicle information data.

As described above, the acquiring section included in the specifications changeable vehicle transmits the vehicle information data to the control specifications data server. Upon the transmission, the data for changing specifications for use in changing the control specifications of the specifications changeable vehicle to the control specifications suited for the vehicle information data is transmitted from the control specifications data server. The changing section included in the specifications changeable vehicle changes the control specifications data stored in the first storing section in accordance with the transmitted data for changing specifications. This enables the control section to control the specifications changeable vehicle using the changed control specifications data.

Thus, the control specifications of the specifications changeable vehicle are changed to the control specifications suited for the vehicle information data without user manipulation. Accordingly, the control specifications of the specifications changeable vehicle can be easily changed such that they are suited for the situation in which the specifications changeable vehicle is used.

Obviously, numerous modifications and variations of the present invention are possible in light of the above teachings. It is therefore to be understood that within the scope of the appended claims, the invention may be practiced otherwise than as specifically described herein.

What is claimed is:

1. A control specifications changing system comprising:

a control specifications data server;

a specifications changeable vehicle configured to communicate with the control specifications data server and comprising:

a first communication device configured to communicate with the control specifications data server;

a first storage configured to store control specifications data that specifies control specifications of the specifications changeable vehicle;

a controller configured to control the specifications changeable vehicle using the control specifications data stored in the first storage;

an acquiring device configured to acquire first vehicle information data representing information about the specifications changeable vehicle and configured to transmit the acquired first vehicle information data to the control specifications data server through the first communication device; and a changing device configured to receive data for changing specifications from the control specifications data server through the first communication device, the data for changing specifications including data for use in changing the control specifications data, the changing device being configured to change the control specifications data stored in the first storage in accordance with the received data for changing specifications; and the control specifications data server comprising:

a second communication device configured to communicate with the specifications changeable vehicle; and a determining device configured to determine the data for changing specifications upon receipt of the first vehicle information data from the specifications changeable vehicle through the second communication device, the data for changing specifications including data for use in changing the control specifications of the specifications changeable vehicle to control specifications suited for the received first vehicle information data, the determining device being configured to transmit the determined data for changing specifications to the specifications changeable vehicle through the second communication device.

2. The control specifications changing system according to claim 1, wherein the second communication device is configured to communicate with a plurality of information providing vehicles each including at least the first communication device and the acquiring device, the control specifications data server further includes a second storage configured to store a plurality of pieces of second vehicle information data representing information about the plurality of information providing vehicles received from the plurality of information providing vehicles through the second communication device, and the determining device is configured to determine the data for changing specifications in accordance with third vehicle information data that satisfies a same condition as a predetermined condition that the first vehicle information data for the specifications changeable vehicle satisfies among the plurality of pieces of second vehicle information data stored in the second storage upon receipt of the first vehicle information data from the specifications changeable vehicle through the second communication device.

3. A control specifications data server comprising:

a second communication device configured to communicate with a specifications changeable vehicle which is configured to perform control using control specifications data that specifies control specifications; and a determining device configured to determine data for changing specifications upon receipt of first vehicle information data representing information about the specifications changeable vehicle from the specifications changeable vehicle through the second communication device, the data for changing specifications including data for use in changing the control specifications data for the specifications changeable vehicle to control specifications suited for the received first vehicle information data, the determining device being configured to transmit the determined data for changing specifications to the specifications changeable vehicle through the second communication device.

4. The control specifications data server according to claim 3, wherein the second communication device is configured to communicate with a plurality of information providing vehicles which are configured to transmit a plurality of pieces of second vehicle information data, respectively to the control specifications data server, the plurality of pieces of second vehicle information data represents information about the plurality of information providing vehicles, the control specifications data server further includes a second storage configured to store the plurality of pieces of second vehicle information data received from the plurality of information providing vehicles through the second communication device, and the determining device is configured to determine the data for changing specifications in accordance with third vehicle information data that satisfies a same condition as a predetermined condition that the first vehicle information data for the specifications changeable vehicle satisfies among the plurality of pieces of second vehicle information data stored in the second storage upon receipt of the first vehicle information data from the specifications changeable vehicle through the second communication device.

5. A specifications changeable vehicle comprising:

a first communication device configured to communicate with a control specifications data server to receive from a control specifications data server control specifications data that specifies control specifications;

a first storage configured to store the control specifications data that specifies the control specifications of the specifications changeable vehicle;

a controller configured to control the specifications changeable vehicle using the control specifications data stored in the first storage;

an acquiring device configured to acquire vehicle information data representing information about the specifications changeable vehicle and configured to transmit the acquired vehicle information data to the control specifications data server through the first communication device; and a changing device configured to change the control specifications data stored in the first storage upon receipt of data for changing specifications from the control specifications data server through the first communication device in accordance with the received data for changing specifications, the received data for changing specifications including data for use in changing the control specifications data for the specifications changeable vehicle to control specifications suited for the transmitted vehicle information data.

* * * * *